United States Patent [19]

Mischenko

[11] Patent Number: 5,475,752
[45] Date of Patent: Dec. 12, 1995

[54] PORTABLE TELEPHONE AND SUPPORT MECHANISM THEREFOR

[75] Inventor: Nicholas Mischenko, Mt. Prospect, Ill.

[73] Assignee: Motorola, Inc., Schaumburg, Ill.

[21] Appl. No.: 490,522

[22] Filed: Jun. 14, 1995

Related U.S. Application Data

[63] Continuation of Ser. No. 382,840, Feb. 3, 1995, abandoned.

[51] Int. Cl.$^6$ .................................................. H04M 1/00
[52] U.S. Cl. ............................................ 379/433; 379/434
[58] Field of Search ................................... 379/455, 454, 379/426, 433, 446, 449; 455/89, 90

[56] References Cited

U.S. PATENT DOCUMENTS

| 3,582,574 | 6/1971 | Gran | 379/449 |
| 5,210,532 | 5/1993 | Knoedler et al. | 379/454 |
| 5,241,592 | 8/1993 | Carlson et al. | 379/433 |
| 5,253,292 | 10/1993 | Fluder et al. | 379/454 |

FOREIGN PATENT DOCUMENTS

| 61-7145 | 1/1986 | Japan | 379/433 |

*Primary Examiner*—Jeffery A. Hofsass
*Assistant Examiner*—Jack Chiang
*Attorney, Agent, or Firm*—Kevin D. Kaschke

[57] ABSTRACT

A support mechanism (11) for a portable telephone (10) which either allows the portable telephone (10) to be carried on the belt of the user or to be used in a hands free mode. The support mechanism (11) attaches to the body of the portable phone (10) and includes an elongate member (18) which is pivotable between a closed position in which the elongate member (18) functions as a belt clip to an open position in which the elongate member (18) functions as a shoulder support or table stand.

7 Claims, 5 Drawing Sheets

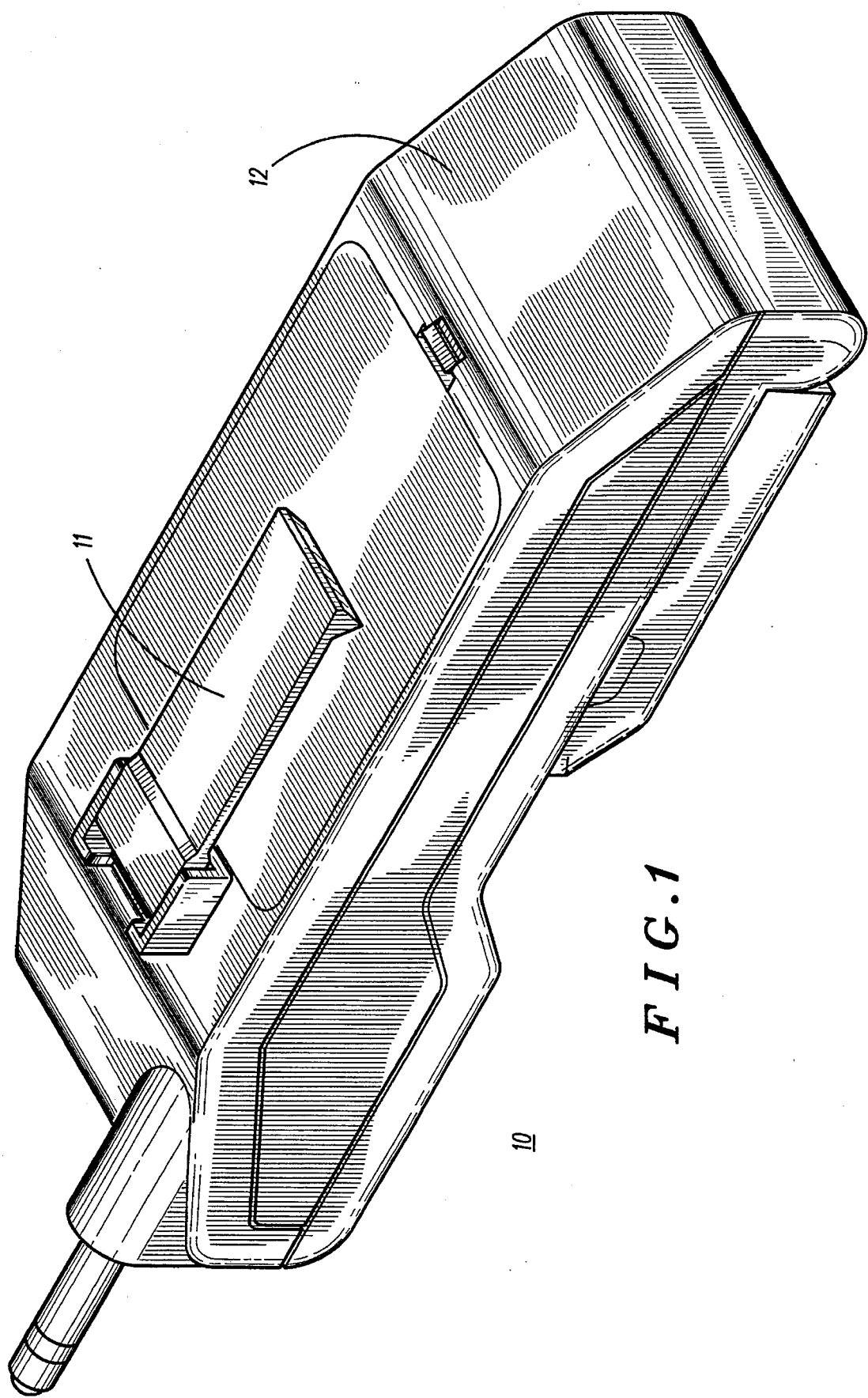

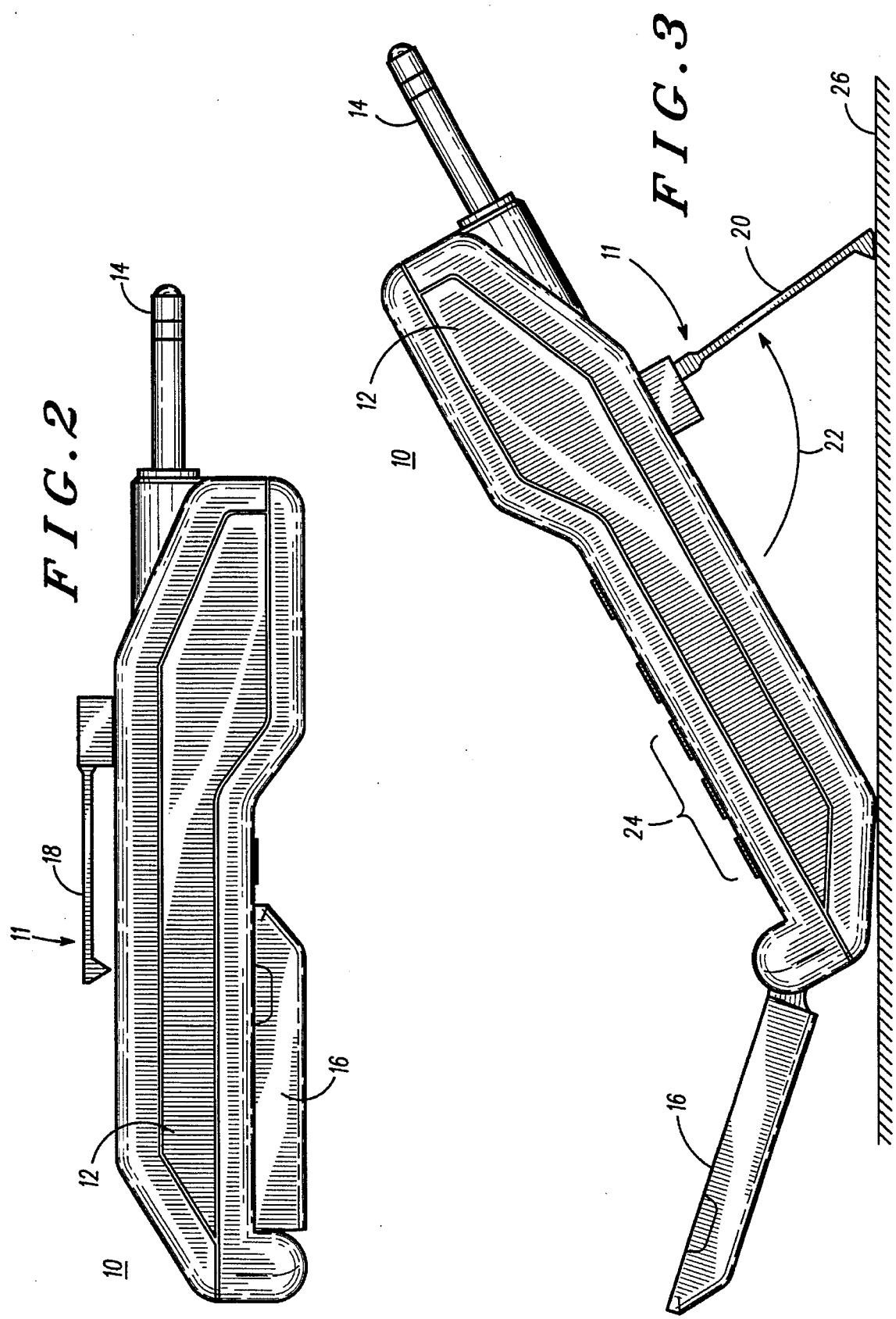

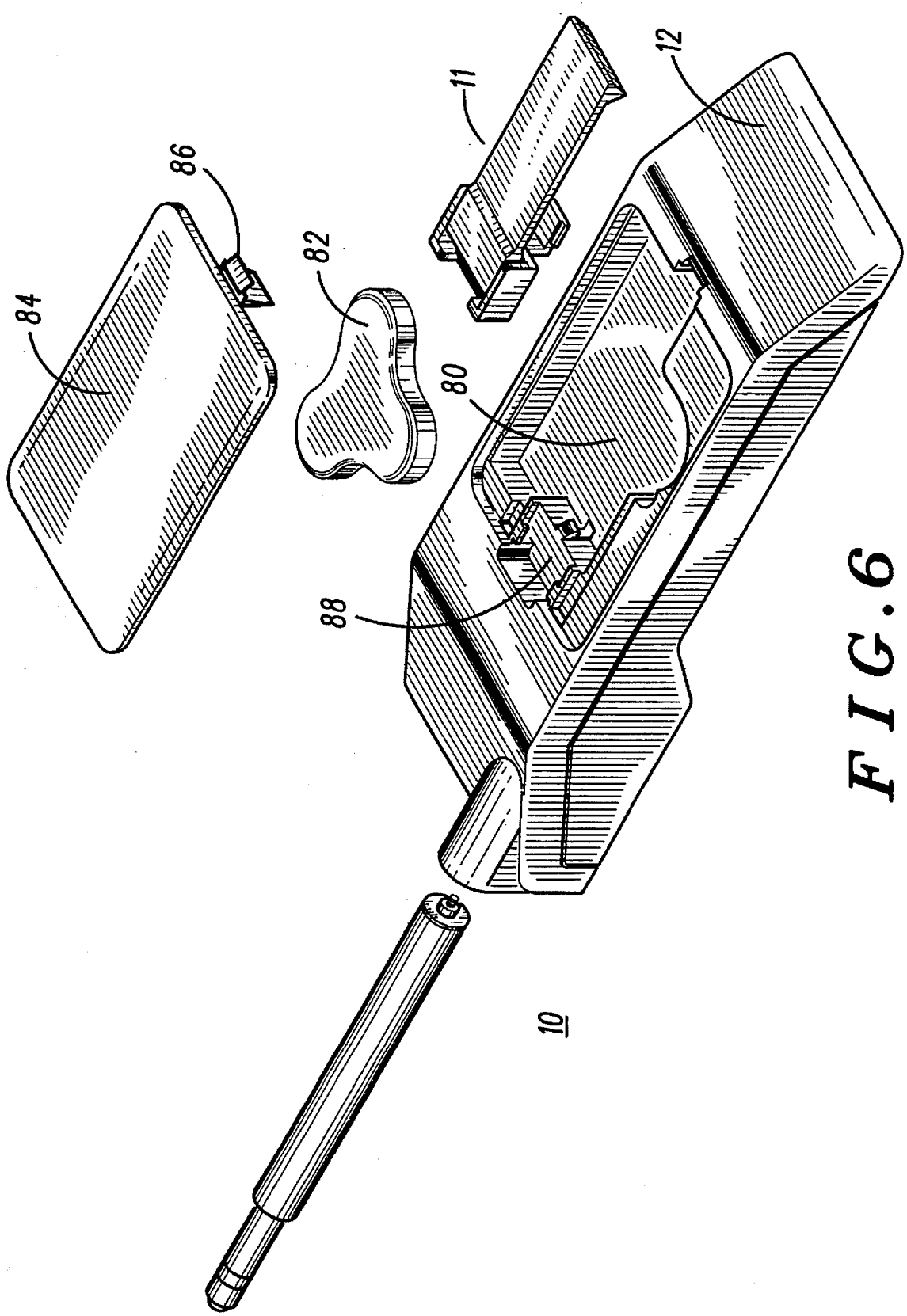

PORTABLE TELEPHONE AND SUPPORT MECHANISM THEREFOR

This is a continuation of application Ser. No. 08/382,840, filed Feb. 3, 1995 and now abandoned.

FIELD OF THE INVENTION

This invention relates generally to a portable telephone and more specifically to a portable telephone and an associated support mechanism for the telephone.

BACKGROUND OF THE INVENTION

Portable telephones in many forms are become increasingly popular. The term "portable telephones" in this context encompasses cellular telephones, patio telephones, cordless telephones in their many different forms, personal communication devices, and the like. Portable telephones are characterized by being easily transportable by the user.

It is desirable that a portable telephone be easily transportable by the user and also function with all the conveniences of a conventional telephone while in use. For easy transportability, some portable telephone are designed to fit into the user's pocket, others have a carrying strap or handle, and still others have a clip (sometimes optional) which allows the portable telephone to be attached to the belt or other wearing apparel of the user.

Such portable telephones, however, have not usually been equipped with a support mechanism which would function either as a shoulder rest so that the portable phone could be supported on the shoulder of the user in a hands-free mode, or, alternatively, could be supported on a desktop or other surface, again in a hands-free mode. Portable telephones have not been equipped with such a support mechanism, especially in combination with a belt clip or other mechanism for easily transporting the portable telephone when not in use.

Accordingly, there is a need for a support mechanism for a portable telephone which would allow such portable telephone to be transported on the person or apparel of the user and would also be useful to support the portable telephone when the telephone was in use.

SUMMARY OF THE INVENTION

The foregoing need is met by a portable telephone and a support mechanism for that telephone in accordance with the present invention. In accordance with one embodiment of the present invention, a portable telephone is provided which includes a radio transceiver and a body member enclosing that radio transceiver. A pivotable support member is attached to the body member. The support member is pivotable between a first position for supporting the portable telephone in attachment to the user's apparel and a second position for supporting the portable telephone in a hands-free operational mode.

BRIEF DESCRIPTION OF THE DRAWINGS

A detailed description of a preferred embodiment of the present invention will be better understood when read with reference to the accompanying drawings in which:

FIG. 1 illustrates, in perspective view, a portable telephone and associated support mechanism in accordance with the present invention;

FIG. 2 illustrates, in side view, the portable telephone and associated support mechanism of FIG. 1 with the support mechanism in a closed position in accordance with the present invention;

FIG. 3 illustrates, in side view, the portable telephone and associated support mechanism of FIG. 1 with the support mechanism in an open position in accordance with the present invention;

FIG. 6 illustrates, in exploded perspective view, the relationship between the support mechanism and its attachment to the portable telephone in accordance with the present invention.

DETAILED DESCRIPTION OF A PREFERRED EMBODIMENT

The detailed description of the preferred embodiment of the present invention can be better understood when read with reference to the accompanying drawings illustrated in FIGS. 1–6.

FIG. 1 illustrates, in perspective view, a portable telephone 10 and an associated support mechanism 11 in accordance with the present invention. An example of a particular type of a portable telephone 10 advantageously utilizing the present invention is a cordless portable telephone. The portable telephone is viewed from the back and includes a body member 12 to which the support mechanism 11 is attached. As illustrated in this FIG. 1, the support mechanism 11 is in a closed position to allow the attachment of the portable telephone to a belt or other apparel of a user. As will be described and illustrated below, in accordance with the present invention, the support mechanism 11 may also be pivotably adjusted to an open position to advantageously provide support of the portable telephone in a hands free mode.

Figure 4:
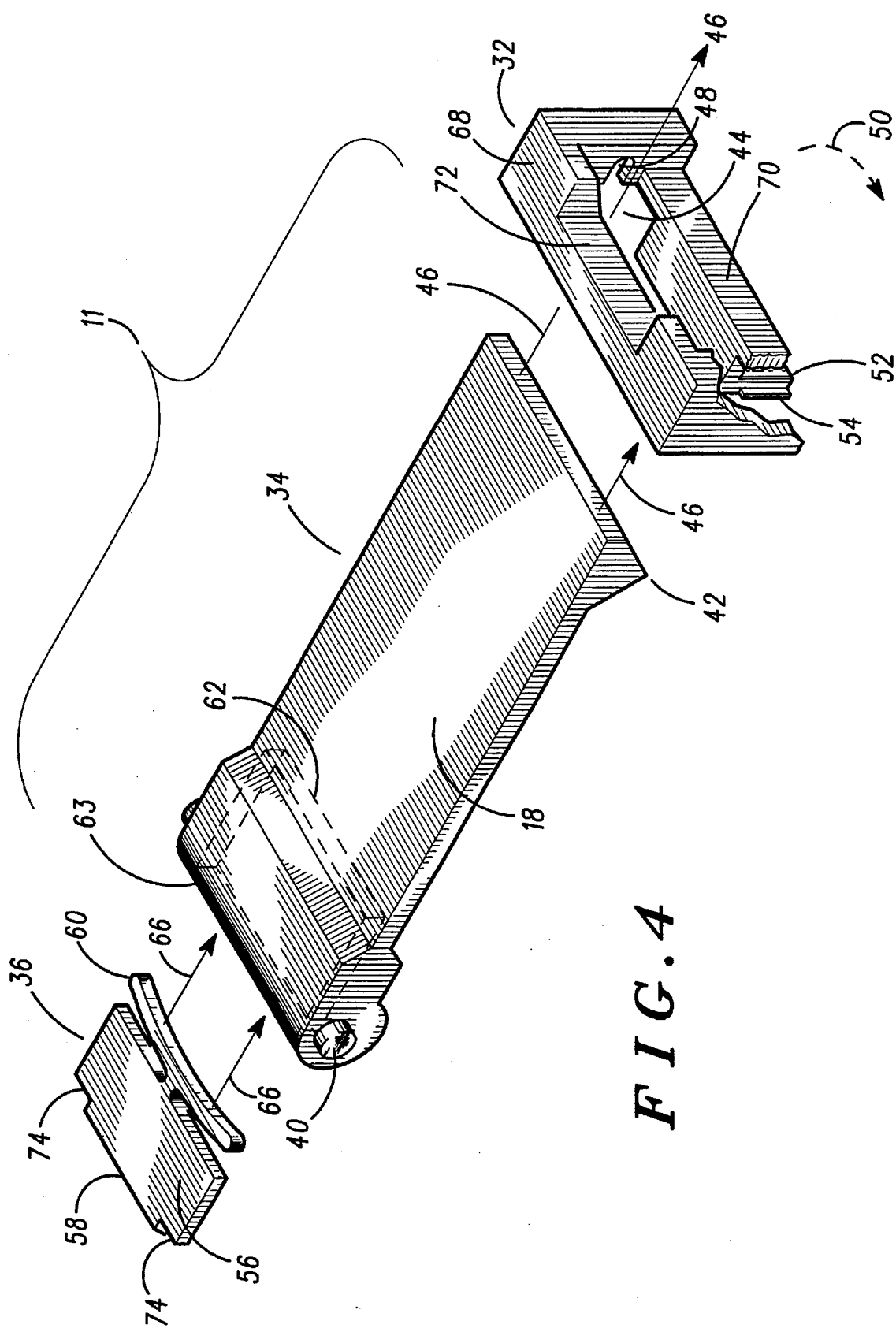
FIG. 4 illustrates, in exploded perspective view, elements of the support mechanism of FIGS. 1–3 in accordance with a preferred embodiment of the present invention.

FIGS. 2 and 3 further illustrate, in side view, the portable telephone 10 and associated support mechanism 11 of FIG. 1 with the support mechanism 11 in a closed and an open position, respectively, in accordance with the present invention. In FIG. 1, portable telephone 10 includes body member 12 which encloses and supports a radio transceiver (not shown). The portable telephone further may include an antenna 14, a flip 16, and other such elements necessary or desirable to the operation of the portable telephone but not necessary for the description of the present invention. The support mechanism 11, to be described more fully below with reference to FIG. 4, is attached to a rear surface of body member 12. In FIG. 2 the support mechanism 11 is shown to be in the closed position with an elongate clip member 18 substantially parallel to the rear surface of the body member 12. In this closed position the elongate clip member 18 functions as a belt clip to attach the portable telephone 10 to the belt or other apparel of the user. In this mode the portable telephone 10 is readily transportable on the person of the user. In pivoting between the closed position and the open position, the elongate clip member 18 rotates through an angle, essentially perpendicular to the portable radiotelephone 10, as illustrated by the arrow 22.

FIG. 3 further illustrates, in side view, portable telephone 10 with elongate clip member 18 of support mechanism 11 in the open position. A flip member 16 of the portable telephone is also shown in the open position to expose a keyboard 24 of the portable telephone 10 and to place the portable telephone 10 in the operational mode. With the support mechanism 11 in the open position, the support mechanism 11 functions as a stand to support the portable telephone 10 on a desktop or other surface 26. Alternatively, in the open position the support mechanism 11 can be used as a shoulder rest to help in balancing the portable telephone 10 on the shoulder of the user.

Figure 5:
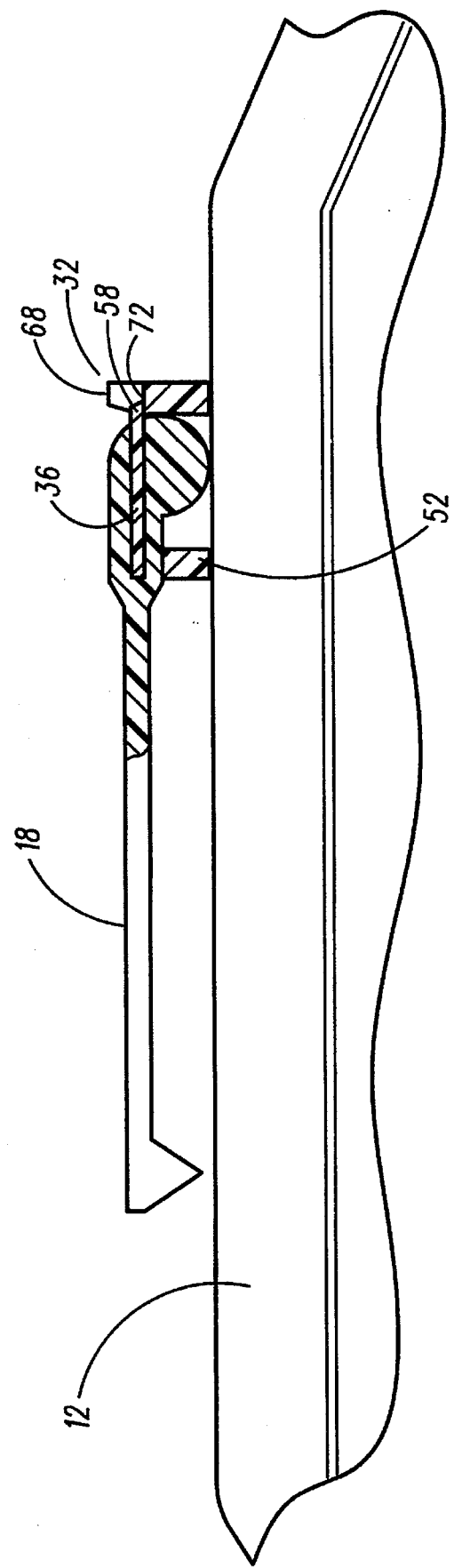
FIG. 5 illustrates, in a cross-sectional view, the support mechanism of FIG. 4 in accordance with a preferred embodiment of the present invention.

FIGS. 4 and 5 are best viewed together to fully understand the elements and function of the support mechanism 11. FIG. 4 illustrates, in an exploded perspective view, elements of the support mechanism of FIGS. 1–3 in accordance with a preferred embodiment of the present invention. FIG. 5 illustrates, in a cross-sectional view, the support mechanism 11 of FIG. 4 in accordance with a preferred embodiment of the present invention. In accordance with the preferred embodiment, support mechanism 11 includes a pivot housing 32, a clip member 34, and a latch 36. The clip member 34 includes the elongate member 18 which, in the closed position, forms a belt clip and, in the open position, forms the shoulder rest or support as described above. Clip member 34 also includes an integral pivot 40 about which the elongate member can rotate. Only one end of the pivot is shown in the perspective view. An identical, coaxial pivot point is located on the opposite side of the clip member but is not visible in this view. Clip member 34 also includes, preferably, a raised portion 42 which serves to aid in securely engaging the portable telephone to the belt or other apparel of the user.

Pivot housing 32, which is attachable to the portable telephone in a matter to be described below, includes an opening 44 through which the clip member 34 is inserted as indicated by the arrows 46. Upon insertion of the clip member through the opening 44 in pivot housing 32, the integral pivot shaft 42 is seated in the pivot socket 48 (only one of which is shown in this view). The clip member 34 is then rotatable about the integral pivot shaft in a direction indicated by the phantom arrow 50. Pivot housing 32 also include a tongue member 52 for the attachment to the body member 12 of the portable telephone 10 in a matter described below. The tongue member 52 also includes, in the preferred embodiment, an alignment tab 54 which positions the tongue member 52 and aids in locking the tongue member 52 and pivot housing 32 to the body member 12 of the portable telephone 10.

Latch 36 includes a flat rectangular body portion 56, a retainer 58 extending from one end of the body member and an integral spring member 60 extending from the opposite end of the body member. Clip member 34 includes a recess 62, shown in phantom, which extends from pivot end 63 of the clip member 34 into the body of the clip member 34. The recess is of a size to accommodate the insertion of latch 36. When latch 36 is inserted into the recess 62 in clip member 34, retainer portion 58 extends outwardly from the end of clip member 34 if integral spring member 60 is in a relaxed or uncompressed state. By pressing upon retainer portion 58, integral spring 60 is compressed and retainer portion 58 may be pushed into recess 62 so that the retainer portion is substantially flush with the pivot end of clip member 34.

The following discussion describes the functional relationship between the pivot housing 32, the clip member 34 and the latch member 36 of the support mechanism 11. Latch member 36 is inserted into recess 62 in clip member 34 as indicated by the arrows 66. Clip member 34, together with latch 36 are inserted through opening 44 in pivot housing 32 in the direction indicated by arrows 46. Clip member 34 is inserted in this matter until pivot shaft 40 is seated in pivot socket 48. The clip member is then rotated about the pivot shaft in the direction indicated by phantom arrow 50. As the clip member 34 is rotated in this matter, the end of retainer 58 bears against the under edge of lip 68 which forms one side of the frame about opening 44. This, in turn, causes spring 60 to be compressed allowing clip member 34 to fully rotate to a position in which the underside of clip member 34 is in contact with lip 70 forming the opposite side of the frame about opening 44. When clip member 34 is fully rotated, retainer 58 is positioned within a notch 72 in lip 68 of pivot housing 32. Notch 72 is wider then retainer 58, allowing latch 36 to be pushed outwardly from recess 62 by the action of integral spring 60. The outward movement of latch 36 is limited by the wide shoulders 74 of latch 36 coming into contact with the underside of lip 68 at the edges of notch 72. With the latch pushed outwardly in this matter by integral spring 60, clip member 34 is constrained and cannot rotate in a direction opposite to arrow 50 because retainer 58 bears against the edge of the notched out portion of lip 68. Clip member 34 is thus constrained in the closed position. Clip member 34 can be rotated, when desired, to the open position, i.e., by rotating in a direction opposite to arrow 50, by depressing retainer 58 and thereby compressing integral spring 60 so that clip member 34 can be rotated without retainer 58 bearing against the edge of notch 72 in lip 68.

FIG. 6 illustrates, in exploded perspective view, the attachment of support member 11 to body member 12 of a portable telephone 10 in accordance with the preferred embodiment. The rear portion of the body member 12 is illustrated. Body member 12 includes a cavity 80 into which a battery 82 is inserted. A removable battery cover 84 encloses the battery in cavity 80. The battery cover includes a spring loaded latch 86 which facilitates the attachment and removal of the battery cover. Body member 12 includes a shaped receptor 88 at the end of cavity 80 which is sized to receive the tongue member 52 and alignment tab 54 of the pivot housing 34. With the battery in place in cavity 80, the tongue member 52 and alignment tab 54 of the pivot housing 34 are inserted into shaped receptor 88. Battery cover 84 is then inserted under clip member 34 of the support mechanism 11 and is secured in place with latch 86. The cover locks tongue member 52 in place in shaped receptor 88. The shaped receptor 88 and battery cover 88 secure the tongue member 52 and position the remainder of the support mechanism 11 external to the body member 12.

The elements of the support mechanism are preferably molded from a strong, resilient material such as polycarbonate. Other materials such as Delrin which provide the strength and flexibility can also be used.

Thus, it is apparent that there has been provided a portable telephone 10 and support mechanism 11 therefor which fully meets the needs set forth above. A pivotable support member 18 of the support mechanism 11 is attached to the portable telephone 10. The support member 18 is pivotable between a first position for supporting the portable telephone 10 in attachment to the user's apparel and a second position for supporting the portable telephone 10 in a hands-free operational mode.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the

What is claimed is:

1. A support mechanism for a portable telephone comprising:

a pivot housing attachable to the portable telephone;

a clip member, including an elongate member, having a recess at one end thereof and an integral pivot shaft engaged with the pivot housing, the clip member pivotable about the axis of the integral pivot shaft between a closed position in which the clip member is operative to serve as a clip for the portable telephone and an open position in which the clip member is operative to serve as a support member for the portable telephone; and a latch, including a retainer having an integral spring insertable into the recess, contacting the clip member for maintaining the clip member in one of the open and closed positions.

2. The support mechanism of claim 1 wherein the retainer extends outwardly from the recess, when the integral spring is relaxed and extended, to bear against the pivot housing to prevent pivoting of the clip member from the closed position.

3. The support mechanism of claim 1 wherein the retainer is depressable into the recess, to compress the integral spring, to allow rotation of the clip member to the open position.

4. A portable telephone comprising:

a radio transceiver;

a body member enclosing the radio transceiver; and a support mechanism comprising:

a pivot housing attachable to the body member;

a clip member, including an elongate member, having a recess at one end thereof and an integral pivot shaft engage with the pivot housing, the clip member pivotable about the axis of the integral pivot shaft between a closed position in which the clip member is operative to serve as a clip for the portable telephone and an open position in which the clip member is operative to serve as a support member for the portable telephone; and a latch, including a retainer having an integral spring insertable into the recess, contacting the clip member for maintaining the clip member in one of the open and closed positions.

5. The portable telephone of claim 4 wherein the retainer extends outwardly from the recess, when the integral spring is relaxed and extended, to bear against the pivot housing to prevent pivoting of the clip member from the closed position.

6. The portable telephone of claim 4 wherein the body member comprises a removable battery housing cover and a concave opening; and the support mechanism further comprises a tongue member integral with the pivot housing, the tongue member shaped to fit into the concave opening, whereby the support mechanism is attached to the portable telephone by inserting the tongue member into the concave opening and securing therein by the battery housing cover.

7. The support mechanism of claim 5 wherein the retainer is depressable into the recess, to compress the integral spring, to allow rotation of the clip member to the open position.

* * * * *